(12) United States Patent
Nakano

(10) Patent No.: US 9,389,484 B2
(45) Date of Patent: Jul. 12, 2016

(54) IMAGE PICKUP DEVICE AND FOCAL PLANE SHUTTER

(71) Applicant: SEIKO PRECISION INC., Narashino (JP)

(72) Inventor: Yoichi Nakano, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 77 days.

(21) Appl. No.: 14/282,306

(22) Filed: May 20, 2014

(65) Prior Publication Data

US 2014/0347534 A1 Nov. 27, 2014

(30) Foreign Application Priority Data

May 24, 2013 (JP) ................... 2013-110284

(51) Int. Cl.
*G03B 9/36* (2006.01)

(52) U.S. Cl.
CPC ....................... *G03B 9/36* (2013.01)

(58) Field of Classification Search
CPC ..................... G03B 9/08–9/54; H04N 5/2254; H04N 5/2353
See application file for complete search history.

(56) References Cited

U.S. PATENT DOCUMENTS

| | | | | |
|---|---|---|---|---|
| 2002/0025167 A1* | 2/2002 | Toyoda | ................. | G03B 9/40 396/484 |
| 2008/0259200 A1* | 10/2008 | Matsumoto | .......... | H04N 5/2254 348/340 |
| 2010/0027987 A1 | 2/2010 | Tanaka | | |
| 2010/0158504 A1* | 6/2010 | Moriyama | ............... | G03B 9/28 396/479 |
| 2011/0103787 A1* | 5/2011 | Niwamae | ........... | H04N 5/23245 396/463 |
| 2011/0176799 A1* | 7/2011 | Shintani | ................... | G03B 9/14 396/484 |
| 2013/0084060 A1* | 4/2013 | Tokura | ..................... | G03B 9/36 396/453 |
| 2013/0258176 A1* | 10/2013 | Jang | ........................ | G03B 9/14 348/367 |

FOREIGN PATENT DOCUMENTS

JP 2009-88825 A1 4/2009
JP 2010-34818 A1 2/2010

* cited by examiner

*Primary Examiner* — Jason Flohre
(74) *Attorney, Agent, or Firm* — Kratz, Quintos & Hanson, LLP

(57) ABSTRACT

An image pickup device includes: an image pickup element; a control portion artificially driving an electronic leading blade by resetting stored charges of the image pickup element in a predetermined direction at every pixel line; and a focal plane shutter includes a board including an opening exposing the image pickup element, a mechanical trailing blade capable of opening and closing the opening, a trailing blade drive lever driving the trailing blade, an actuator actuating the trailing blade drive lever, a shading member capable of opening and closing at least a part of the opening, a shading member drive lever driving the shading member, a connection member provided on the shading member drive lever, and a biasing member biasing the shading member drive lever such that the shading member recedes from the opening.

8 Claims, 9 Drawing Sheets

IMAGE PICKUP DEVICE AND FOCAL PLANE SHUTTER

CROSS-REFERENCE TO RELATED APPLICATION

This application is based upon and claims priority to Japanese Patent Application No. 2013-110284 filed on May 24, 2013, subject matter of this patent document is incorporated by reference herein in its entirety.

BACKGROUND (i) Technical Field

The present invention relates to focal plane shutters and optical apparatus.

(ii) Related Art

For example, Japanese Patent Unexamined Application Publication No. 2010-34818 discloses an image pickup device with an electronic leading blade and mechanical leading blades. After the electronic leading blade moves in the state where the trailing blades recede from an opening of a board, the trailing blades close the opening to perform exposure.

After the exposure operation is finished, a reading operation of image data from the image pickup element is performed. During the reading operation of image data, shading of light entering the image pickup element is required taking image quality into consideration. Therefore, after the exposure operation is finished, maintaining the state where the trailing blades close the opening for a predetermined period is required.

In case of a normally-open type shutter, after the exposure operation is finished, the trailing blade recedes from the opening after the reading operation of image data from the image pickup element is performed. This enables a live view display to display outputs from the image pickup element on a liquid crystal monitor of a camera in real time.

Also, in case of continuous shooting, the trailing blades have to recede from the opening to perform a charging operation for the next shooting, after the reading operation of image data from the image pickup element is finished after the exposure operation is finished.

Therefore, after the exposure operation is finished, the trailing blade will not be driven until the reading operation of image data from the image pickup element is performed. Therefore, a shooting interval might not be shortened.

SUMMARY

It is therefore an object to provide an image pickup device and a focal plane shutter capable of shortening a shooting interval in using an electric leading blade.

According to an aspect of the present invention, there is provided an image pickup device including: an image pickup element; a control portion artificially driving an electronic leading blade by resetting stored charges of the image pickup element in a predetermined direction at every pixel line; and a focal plane shutter including: a board including an opening exposing the image pickup element; a mechanical trailing blade capable of opening and closing the opening; a trailing blade drive lever driving the trailing blade; an actuator actuating the trailing blade drive lever; a shading member capable of opening and closing at least a part of the opening; to shading member drive lever driving the shading member; a connection member provided in the shading member drive lever; and a biasing member biasing the shading member drive lever such that the shading member recedes from the opening; wherein: the trailing blade drive lever and the connection member are brought to a connected state of being connected to each other, in a state where the trailing blade closes the opening and the shading member recedes from the opening; when the trailing blade drive lever moves such that the trailing blade recedes from the opening in the connected state, the shading member drive lever moves such that the shading member travels to the opening in response, to the trailing blade drive lever with maintaining a closed state of the opening; the connected state is released while the trailing blade drive lever moves such that the trailing blade recedes from the opening, and the shading member drive lever is moved, by a biasing force of the biasing member such that the shading member recedes from the opening; and the control portion reads out image data from the image pickup element in the closed state.

According to another aspect of the present invention, there is provided a focal plane shutter including: a board including an opening; a mechanical trailing blade capable of opening and closing the opening; a trail inn blade drive lever driving the trailing blade; an actuator actuating the trailing blade drive lever; a shading member capable of opening and closing at least a part of the opening; a shading member drive lever driving the shading member; a connection member provided in the shading member drive lever; and a biasing member biasing the shading member drive lever such that the shading member recedes from the opening; wherein: the trailing blade drive lever and the connection member are brought to a connected state of being connected to each other, in a state where the trailing blade closes the opening and the shading member recedes from the opening; when the trailing blade drive lever moves such that the trailing blade recedes from the opening in the connected state, the shading member drive lever moves such that the shading member travels to the opening in response to the trailing blade drive lever with maintaining a closed state of the opening; and the connected state is released while the trailing blade drive lever moves such that the trailing blade recedes from the opening, and the shading member drive lever is moved by a biasing force of the biasing member such that the shading member recedes from the opening.

DETAILED DESCRIPTION

Figure 1:
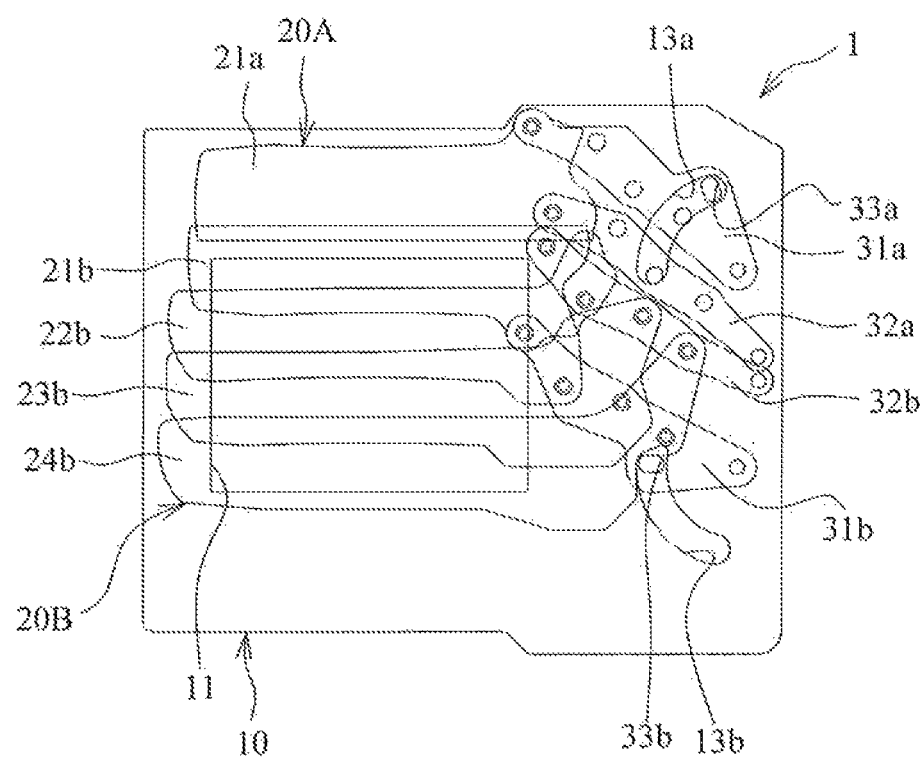
FIG. 1 is a front view of a partial configuration of a focal plane shutter according to the present embodiment.

An embodiment will be described later with reference to the drawings. FIG. 1 is a front view of a partial configuration of a focal plane shutter 1 according to the present embodiment.

As illustrated in FIG. 1, the focal plane shutter I includes a board 10, blades 21a, 21b to 24b, and arms 31a, 32a, 31b, and 32b. The board 10 is made of a resin and includes an opening 11 having a rectangular shape.

Trailing blades 20B include four blades 21b to 24b. Also, a shading member 20A includes four blades. However, only one blade 21a is illustrated in FIG. 1. FIG. 1 illustrates the shading member 20A in an overlapped state and the trailing blades 20B in an expanded state. In FIG. 1, the shading member 20A recedes from the opening 11 and the trailing blades 20B close the opening 11.

As illustrated in FIG. 1, the shading member 20A is connected to the arms 31a and 32a. The trailing blades 20B are connected to the arms 31b and 32b. Each of arms 31a, 32a, 31b, and 32b is swingably supported by the board 10. The arms 31a and 31b are formed with fitting holes 33a and 33b, respectively.

Figure 2:
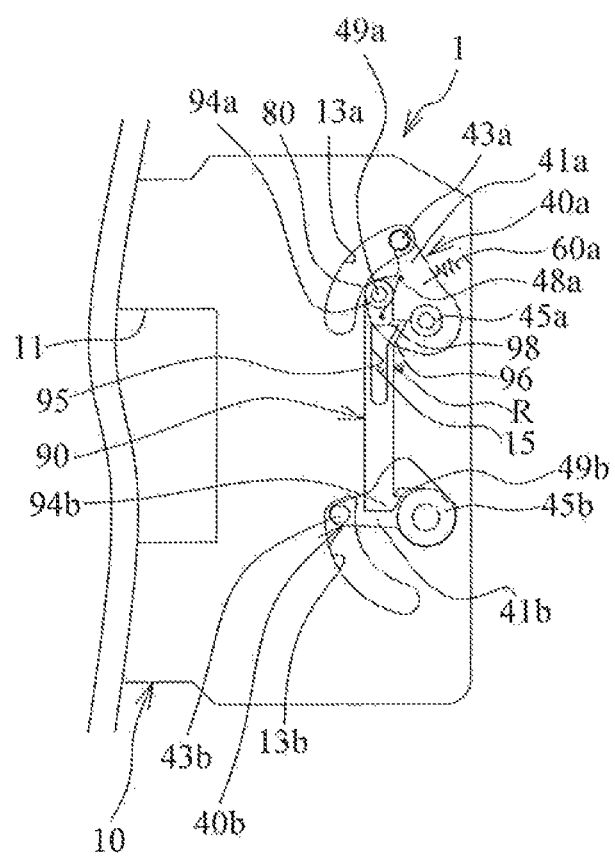
FIG. 2 is a front view of a partial configuration of the focal plane shutter.

As illustrated in FIG. 2, the board 10 is provided with a shading member drive lever 40a (hereinafter, referred to as drive lever) and a trailing blade drive lever 40b (hereinafter, referred to as drive lever) that drive the arms 31a and 31b, respectively. The drive levers 40a and 40b are respectively provided with spindles 45a and 45b. The spindles 45a and 45b are rotatably supported by the board 10. Thus, each of the drive levers 40a and 40b is swingably supported in a given range by the board 10. The drive levers 40a and 40b are respectively provided with drive pins 43a and 43b. The board 10 is provided with escape holes 13a and 13b that escape the movements of the drive pins 43a and 43b, respectively. Each of the escape holes 13a and 13b has an arc shape, 30. The drive pins 43a and 43b are respectively fitted into the fitting hole 33a of the arm 31a and the fitting hole 33b of the arm 31b. Swinging the drive lever 40a causes the arm 31a to swing and to move the shading member 20A. Likewise, swinging the drive lever 40b causes the arm 31b to swing and to move the trailing blades 20B.

Additionally, the drive lever 40a is biased by a return spring 60a so that the shading member 20A recedes from the opening 11. One end of the return spring 60a is secured to the board 10 and the other end of the return spring 50a is secured to the drive lever 40a. The return spring 60a is an example of a biasing member. The drive levers 40a and 40b have flat portions 41a and 41b, respectively. The spindles 45a and 45b protrude from the flat portions 41a and 41b, respectively. The drive pins 43a and 43b protrude in the direction opposite to the direction in which the spindles 45a and 45b protrude.

Figure 3:
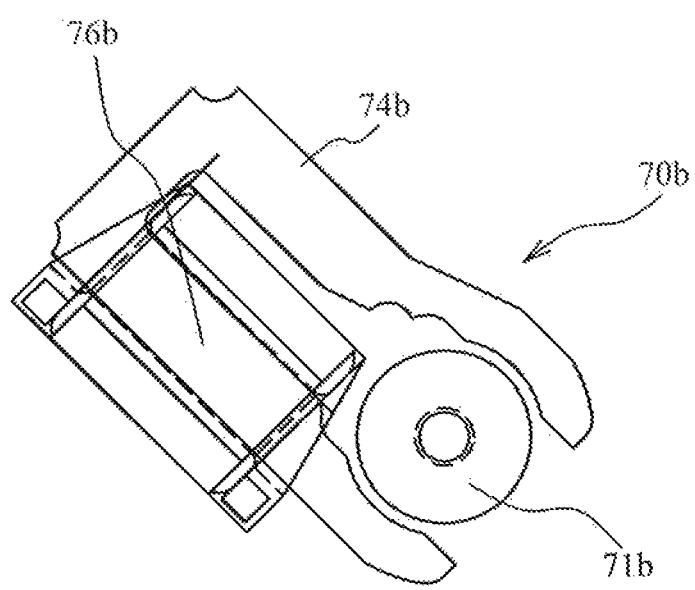
FIG. 3 is an explanatory view of an actuator.

FIG. 3 is a view of an actuator 70b employed to the focal plane shutter 1. The actuator 70b is supported on the board 10. The actuator 70b includes a rotor 71b rotatably supported by the board 10, a stator 74b excited to generate magnetic force between the stator 74b and the rotor 71b, and a coil 76b for exciting the stator 74b. The rotor 71b is a permanent magnet that, is energized to have different polarities in the circumferential direction. A rotation axis of the rotor 71b is connected to the spindle of the drive levers 40b. Accordingly, energization to the coil 76b causes the rotor 71b to rotate so that the drive lever 40b rotates. The rotation of the drive lever 40b causes the trailing blades 20B to drive. And also, opposite energization to the coil 76b causes the rotor 71b to rotate in the reverse direction so that the trailing blades 20B drive in the direction opposite to the direction described above. Additionally, the rotor 71b may be indirectly connected to the drive lever 40b through a gear or the like. Specifically, the drive lever 40b may rotate in response to the rotation of the rotor 71b.

The focal plane shutter 1 is provided with a connection member 90 as illustrated in FIG. 2. The connection member 90 and the drive or 40b are linked together for driving the drive lever 40a. The connection member 90 is swingably provided in the drive lever 40a and is connectable to the drive lever 40b. A proximal end of the connection member 90 is provided with a cylindrical portion 94a. The cylindrical portion 94a, acting as a support portion, is rotatably fitted onto a spindle 49a formed on the flat portion 41a of the drive lever 40a. Accordingly, the connection member 90 is swingably supported with respect to the drive lever 40a.

An engaged portion 94b is provided at a distal end of the connection member 90. The engaged portion 94b is capable of engaging an engagement portion 49b protruding from a circumference of the spindle 45b of the drive lever 40b. As described above, the connection member 90 is a substantially plate shaped member extending from the drive lever 40a to the drive lever 40b, that is, extending from the support portion to the engaged portion. In FIG. 2, the engagement portion 49b engages the engaged portion 94b to be brought to a connected state where the connection member 90 is connected to the drive lever 40a. The engaged portion 94b is supported on the flat portions 41b. Thus, the proximal end of the connection member 90 is supported on the flat portion 41a of the drive lever 40a and the distal end of the connection member 90 is supported on the flat portion 41b of the drive lever 40b. The flat portions 41a and 41b are located substantially on the same plane. FIGS. 1 and 2 illustrate a state immediately after an exposure operation, and the state is brought into the connected state immediately after the exposure operation.

The drive lever 40a and the connection member 90 are provided with a connection spring 80 that biases the connection member 90 to the drive lever 40b for maintaining the connected state. The connection spring 80 fits with the cylindrical portion 94a. One end of the connection spring 80 abuts a protruding portion 48a formed on the drive lever 40a. The other end of the connection spring 80 abuts a protruding portion 98 formed on the connection member 90. The connection spring 80 biases the connection member 90 counterclockwise. Accordingly, the engaged portion 94b of the connection member 90 is biased toward the drive lever 40b. The connection spring 80 is an example of a connection biasing member.

The connection member 90 is formed of an escape hole 95 extending along the longitudinal direction thereof. A protruding portion 15 provided in the board 10 fits in the escape hole 95 with some clearance. In other words, the connection member 90 may be movable in the longitudinal direction thereof in a predetermined range and may be swingable about the spindle 49a in a predetermined range in the state where the protruding portion 15 stays in the escape hole 95.

The connection member 90 is provided with an inclined portion 96 near the cylindrical portion 94a. The inclined portion 96 inclines to protrude to the outside in the direction from the engaged portion 94b to the cylindrical portion 94a. The inclined portion 96 side of the connection member 90 is provided with a roller R rotatably provided about a spindle of the board 10, as described later.

Additionally, the connection member 90 is constantly supported on the flat portions 41a and 41b of the two drive levers 40a and 40b. It is preferable that a thickness of the connection member 90 is configured not to exceed each thickness of the spindles 45a and 45b.

Figure 4:
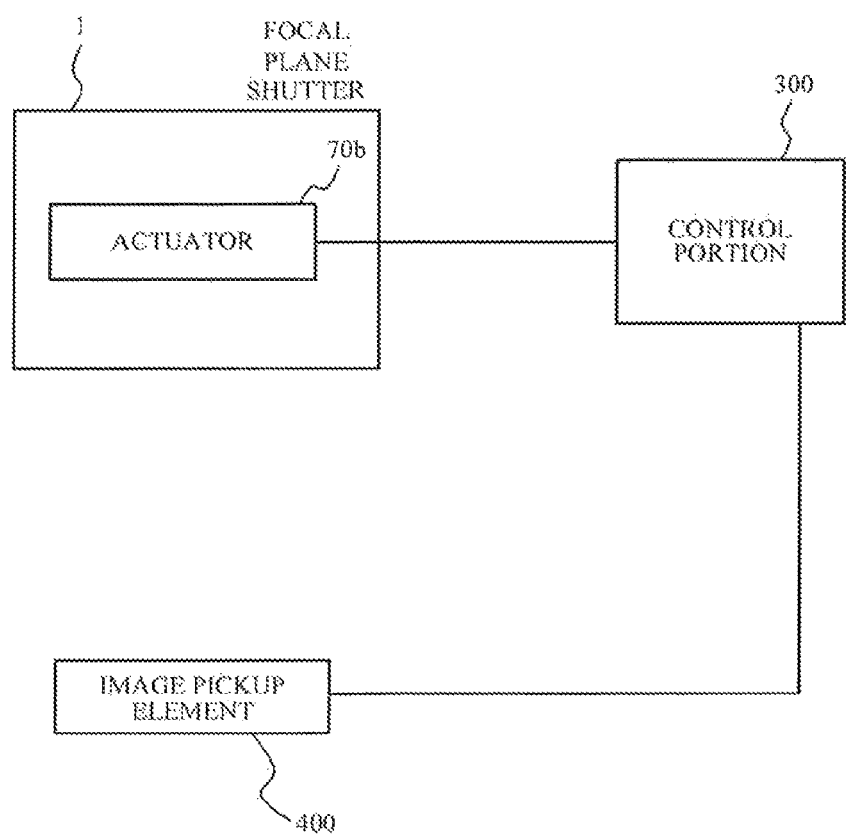
FIG. 4 is a block diagram of a camera including the focal, plane shutter.

A description will be given of a configuration of a camera equipped with the focal plane shutter 1. FIG. 4 is a block diagram of the camera equipped with the focal plane shutter 1. The camera includes: the focal plane shutter 1; a control portion 300; and an image pickup element 400. The control portion 300 controls an operation of the whole camera and includes a CPU, a ROM, and a RAM. Additionally, the camera includes lenses, not illustrated in FIG. 5, for adjusting a focal length.

The control portion 300 controls an energization state of the coil 76b of the actuator 70b. The image pickup element 400 changes an object image into electric signals to generate image data. The control portion 300 reads and stores the image data generated in the image pickup element 400. The image pickup element 400 is, for example, a CCD or a CMOS.

The control portion 300 is an example of a control portion sequentially resetting charges stored in the image pickup element 400 for every pixel line in a predetermined direction such that an electronic leading blade moves in a simulated manner. Specifically, the charges stored in the image pickup element 400 are reset for every pixel line in the direction perpendicular to the direction in which the trailing blades 20B move. Therefore, the electronic leading blade artificially moves from an exposure start position to an exposure end position. Also, the image pickup element 400 is exposed from the opening 11, when the shading member 20A and the trailing blades 20B recede from the opening 11.

Additionally, a models changed into a single shooting mode or a continuous shooting mode, as depending on the operation to the release button of the camera. The mode is changed to the continuous shooting mode by long pushing of the release button, and the camera shoots continuously while the release button is pushed. The mode is changed to the single shooting mode by short pushing of the release button, and the camera shoots an image whenever the release button is pushed.

Figure 5:
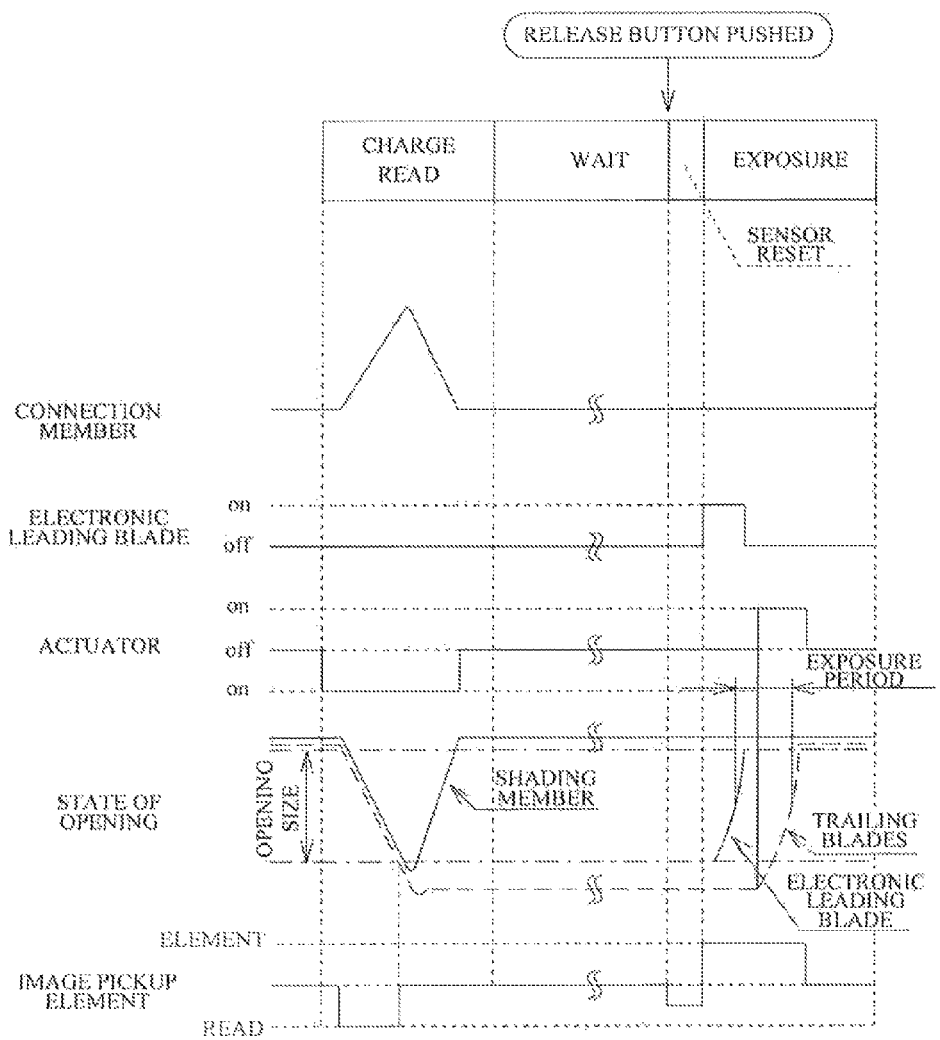
FIG. 5 is a timing chart of the focal plane shutter.

Next, an operation of the focal plane shutter 1 will be described. FIG. 5 is a timing chart of the focal plane shutter 1. FIGS. 6 to 9 are explanatory views of the operation of the focal plane shutter 1. Additionally, some parts are omitted in FIGS. 6 to 9. Additionally, some reference numerals are omitted in FIGS. 6 to 9. FIGS. 1 and 2 illustrate a state just after an exposure operation is finished. Additionally, the shading member 20A, the trailing blades 20B, and the like are omitted in FIGS. 8 and 9.

Figure 6:
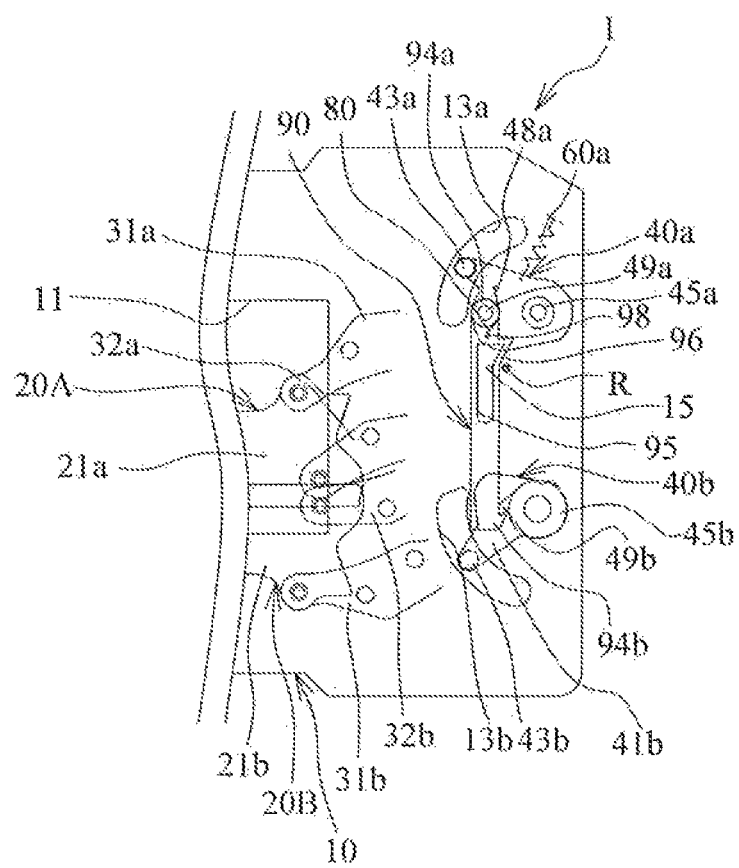
FIG. 6 is an explanatory view of an operation of the focal plane shutter.

After the exposure operation illustrated in FIGS. 1 and 2 is finished, a charging operation is started. Specifically, the drive lever 40b swings counterclockwise by energization of the actuator 70b. Because the connection member 90 is connected to the drive lever 40b, swinging the drive lever 40b in the counterclockwise direction allows the connection member 90 to move in the direction from the drive lever 40a side to the drive lever 40b side. Accordingly, the drive lever 40a also swings counterclockwise. Therefore, the trailing blades 20B move away from the opening 11. The shading member 20A expands and moves to close the opening 11. FIG. 6 illustrates a state where the drive lever 40a is swinging in the connected state.

Here, in the connected state, the shading member 20A and the trailing blades 20B move to maintain a closed state of the opening 11. In particular, when the drive lever 40b moves such that the trailing blades 20B move away from the opening 11, the drive lever 40a moves in conjunction with the drive lever 40b such that the shading member 20A moves toward the opening 11 to follow the trailing blades 20B moving away from the opening 11 with maintaining the closed state of the opening 11. Thus, while the trailing blades 20B is moving away from the opening 11, the shading member 20A moves toward the opening 11 to maintain the closed state of the opening 11.

The inclined portion 96 abuts the roller R while the drive lever 40b swings in the counterclockwise direction and the trailing blades 20B recede from the opening 11. The more the connection member 90 move to the drive lever 40b side, the more the connection member 90 swings in the clockwise direction such that the engaged portion 94b moves away from the engagement portion 49b. This causes the engaged portion 94b to disengage the engagement portion 49b to release the conned state. In other words, the inclined portion 96 and the roller R guide the connection member 90 such that the engaged portion 94b disengage the engagement portion 49b. At this stage, the connection member 90 swings in the clockwise direction against a biasing force of the connection spring 80. When the closed state is released, the drive lever 40a swings in the clockwise direction by a biasing force of the return spring 60a. Accordingly, the shading member 20A recedes from the opening 11 and the connection member 90 returns to an initial position. Additionally, the drive lever 40b continuously swings in the counterclockwise direction, and the trailing blades 20B recede from the opening 11 to position at a movement start position.

Figure 8:
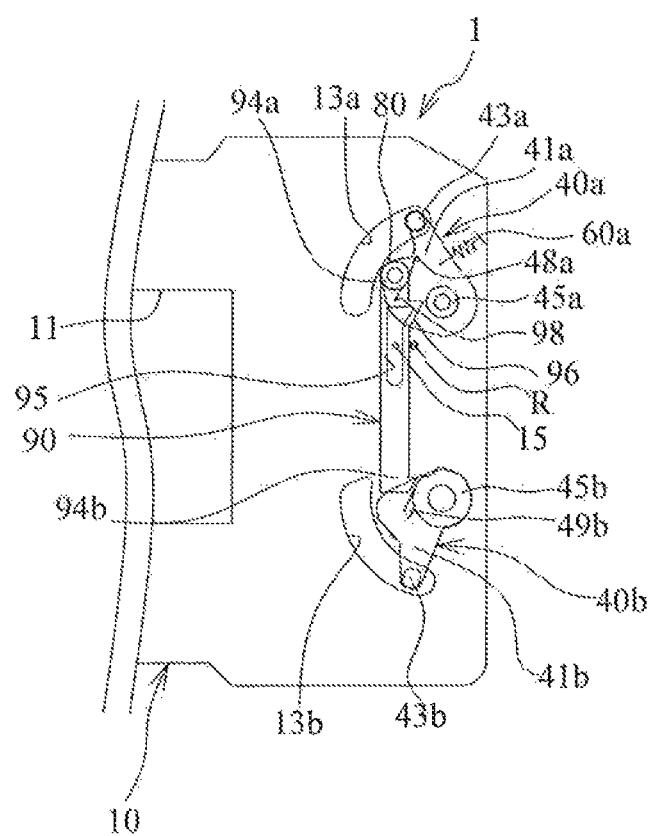
FIG. 8 is an explanatory view of the operation of the focal plane shutter.

With this stage, as illustrated in FIG. 8, the shading member 20A and the trailing blades 20B recede from the opening 11, allowing the opening 11 to be the open state. The focal plane shutter 1 is in a waiting state illustrated in a timing chart in FIG. 5. Additionally, in the waiting state, the energization of the actuator 70b is stopped. Further, in the waiting state, receding of the shading member 20A and the trailing blades 20B from the opening 11 allow a live view display where images from the image pickup element 400 are displayed on a liquid crystal display monitor of the camera in real time.

Additionally, as illustrated in FIG. 8, the state where the connection member 90 abuts the roller R is maintained by the biasing force of the connection spring 80 in the to where the connected state is released. This suppresses a rattling of the connection member 90. And also even in the state where the connected state is released, the distal end of the connection member 90 is supported on the flat portion 41b of the drive lever 40b regardless of the position of the drive lever 40b. This allows the connection member 90 to be supported stably.

Subsequently, in shooting, a release button of the camera is pushed, the control portion 300 performs a sensor reset to erase the charges stored in the image pickup element 400. Next, the control portion 300 controls the image pickup element 400 to move the electronic leading blade from the exposure start position so the exposure end position in a simulated manner. After as predetermined period lapses since the electronic leading blade starts moving, the control portion 300 energizes the coil 76b of the actuator 70b. This causes the drive lever 40b to rotate clockwise. Then, the engagement portion 49b of the drive, lever 40b abuts the engaged portion 94b to swing the connection member 90 in the clockwise direction around the spindle 49a. Accordingly, the engagement portion 49b engages the engaged portion 94b again to be brought to the connected state as illustrated in FIG. 2.

In such a way, one cycle, of shooting is finished. The energization of the coil 76b of the actuator 70b is stopped after a given period lapses since the energizations starts. The fully opened state of the opening 11 as illustrated in FIG. 8 is formed not only in photo shooting but also in movie shooting.

Figure 7:
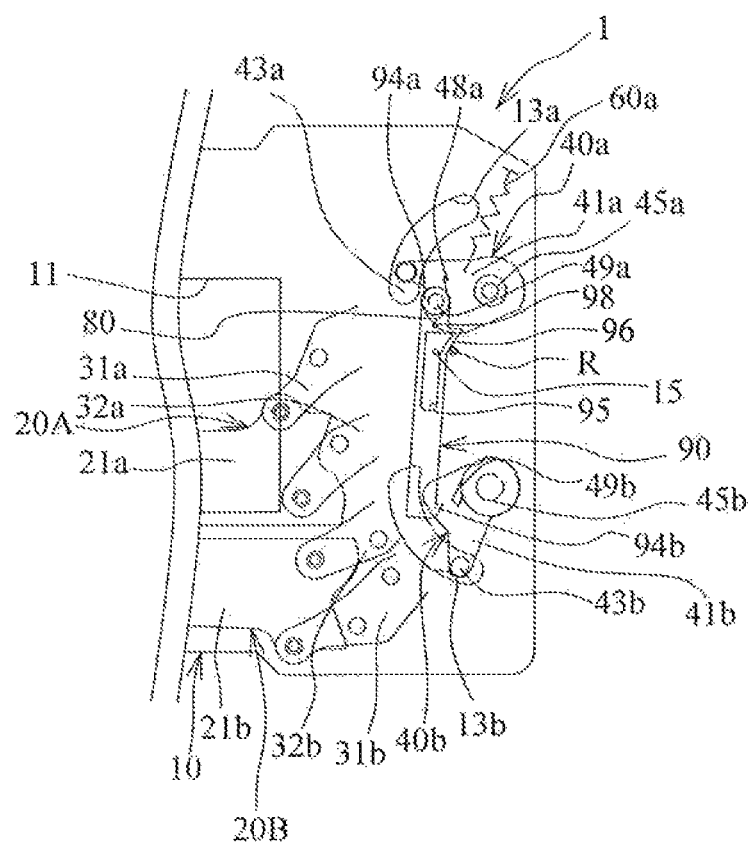
FIG. 7 is an explanatory view of the operation of the focal plane shutter.

After the exposure operation is finished, the charging operation is performed by maintaining the state, illustrated in FIGS. 6 and 7, in which the trailing blades 20B recede from the opening 11, again.

In the continuous shooting mode, after a predetermined period lapses since the charging operation is finished, the sensor reset is performed to erase the charges stored in the image pickup element 400, and then the exposure is performed again. A waiting period in the continuous shooting mode is set longer than a period needed for stopping of the bound of the shading member 20A at the time when the shading member 20A moves away from the opening 11 and stops. In the single shooting mode, the real-time images are displayed on the liquid crystal monitor of the camera in a wait state after the charging operation.

Here, in the charging operation, while the trailing blades 20B are moving away from the opening 11, the shading member 20A moves toward the opening 11 to maintain the closed state of the opening 11 in cooperation with the trailing blades 20B, as mentioned above. In the charging operation in which the shading member 20A and the trailing blades 20B cooperatively close the opening 11, the control portion 300 reads the image data from the image pickup element 400 until the closed state is released by the inclined portion 96 and the roller R.

Thus, a period needed for shooting an image can be shortened, as compared with a case where the charging operation is performed after the reading of the image date from the image pickup element 400 is finished. Therefore, high-speed continuous shooting can be achieved in the continuous shooting mode. Also, a period needed for shooting an image can be shortened even in the single shooting mode, thereby shortening a shooting interval.

Additionally, the image data are read from the image pickup element 400 in the closed state of the opening 11 in the present embodiment, so the smear or the like can be prevented. Also, the reading of the image data may start, before the trailing blades 20B start moving away from the opening 11 after the exposure operation is finished. The reading of the image data has only to be finished, after the connected state is released before the opening 11 starts being opened by moving the shading member 20A and the trailing blades 20B away therefrom.

A releasing timing of the connected state may be in a way where the trailing blades 20B is moving to recede from the opening 11 or in a time where the trailing blades 20B completely recedes from the opening 11. That is, she connected state may be released even during the charging operation of the trailing blades 20B as long as after the reading of the image date from the image pickup element 400 is finished.

Additionally, the shading member 20A may not have a size of the blade that completely closes the opening 11. This is because that the shading member 20A only have to maintain the opening 11 in the closed state, in cooperation with the trailing blades 20B during the charging one of the trailing blades 20B, until the reading of the image data from the image pickup element 400 is finished.

The connection member 90 is a substantially plate-shaped member extending from the drive lever 40a to the drive lever 40b and not extending from the board 10 having a rectangular shape. Additionally, the connection member 90 locates between the opening 11 and a phantom line, which connects the spindles 45a and 45b that are the respective swinging centers of the drive levers 40a and 40 b, thereby suppressing an increase in the size of the focal plane shutter 1.

Additionally, by exchanging the roller R to another roller different in diameter therefrom, a release timing of the connected state can be changed. Specifically, the more a diameter of the roller increases, the more the connection member 90 inclines in a direction where the connection member 90 separates from the drive lever 40b, and the more the abutment area between the engaged portion 94b and the engagement portion 49b decreases in the connected state. This allows an adjustable releasing timing when the engaged portion 94b is disengaged from the engagement portion 49b by abutting the roller with the inclined portion 96. Accordingly, even in different kinds of cameras whose reading periods of the image data from the image pickup element 400 are different, a period where the opening 11 is maintained in the closed state can be controlled corresponding to the reading periods of the image data by exchanging the roller.

The focal plane shutter 1 is not provided, with an electromagnet for holding the drive lever 40a at a predetermined position or an actuator for driving the drive lever 40a. Thus, as for the focal plane shutter the number of the parts is reduced, so reduced size, reduced weight, and reduced cost are achieved. Also, there is no set member for charging the drive levers 40a and 40b, thereby suppressing the number of the parts and achieving downsizing, lighting weight, and reducing cost.

The shading member 20A does not drive at the time of the exposure operation. The exposure operation is performed by the electronic leading blade and the mechanical trailing blades 20B. Thus, unlike mechanical leading blades, the movement property of the shading member 20A, for example, such as a movement start timing, does not have to be strictly set.

Figure 9:
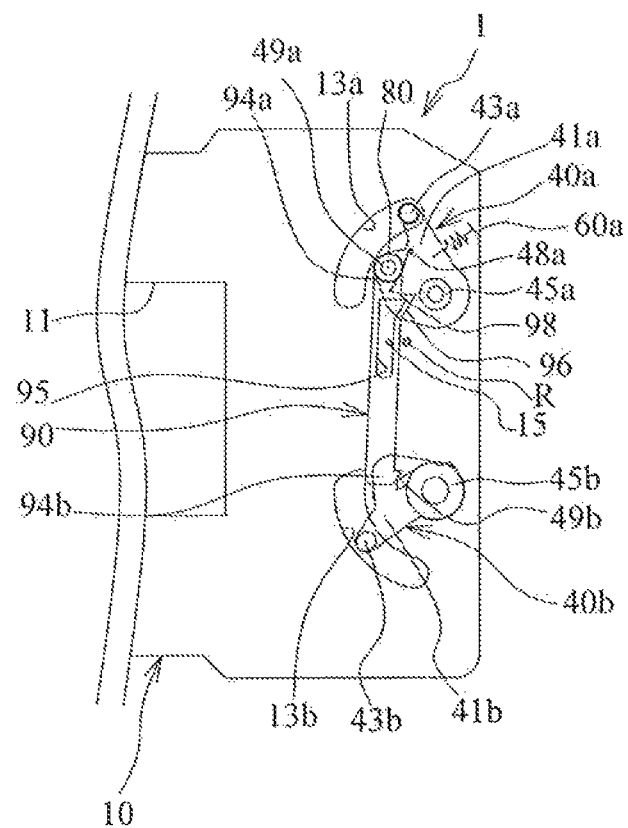
FIG. 9 is an explanatory view of the operation of the focal plane shutter.

As illustrated in FIGS. 8 and 9, the drive lever 40b rotates clockwise in the state where the connected state is released so that the engagement portion 49b of the drive lever 40b abuts the engaged portion 94b of the connection member 90 during the drive lever 40b swings. Next, the engagement portion 49b pushes the engaged portion 94b against the biasing force of the connection spring 80 to swing the connection member 90 so that the connection member 90 recedes from the drive lever 40b. Accordingly, the engagement portion 49b engages the engaged portion 94b. The exposure operation is finished as described above.

When the drive lever 40b swings clockwise to stop in the exposure operation, the drive pin 43b of the drive lever 40b might abut the end of the escape hole 13b to bounce in the counterclockwise direction. This might cause re-exposure. In the present embodiment, a state where the engagement portion 49b engages the engaged portion 94b is configured when the drive lever 40b stops. Here, the engaged state is maintained by the biasing forces of the return spring 60a and the connection spring 80. This may also restrict the bouncing oil the drive lever 40b in the counterclockwise direction.

Additionally, when the drive, lever 40b swings clockwise to stop in the exposure operation, the engagement portion 49b pushes the engaged portion 94b to swing the connection member 90 against the biasing forces of the connection spring 80. Therefore, a swinging speed of the drive lever 40b may be decreased just before the drive lever 40b stops. This may also restrict the bouncing of the drive lever 40b.

While the preferred embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

Although blades that are made of a synthetic resin has been described in the present embodiment, blades may be made of a thin-shaped metal.

In the above embodiment, the shading member and the trailing blades are each composed of four blades. However, the shading member and the trailing blades are not limited to these arrangements. The shading member and the trailing blades may be each composed of two to five blades. The number of the blades of the shading member may be different from the number of the blades of the trailing blades.

The escape hole 95 of the connection member 90 and the protruding portion 15 of the board 10 may not be provided. The escape hole 95 and the protruding portion 15 are provided in consideration of assembly workability.

The invention claimed is:

1. An image pickup device comprising:
    an image pickup element;
    a control portion artificially driving an electronic leading blade by resetting stored charges of the image pickup element: in a predetermined direction at every pixel line; and
    a focal plane shutter including:
        a board including an opening exposing the image pickup element;
        a mechanical trailing blade capable of opening and closing the opening;
        trailing blade drive lever driving the trailing blade;
        an actuator actuating the trailing blade drive lever;
        a shading member capable of opening and closing at least a part of the opening;
        a shading member drive lever driving the shading member;
        a connection member provided in the shading member drive lever; and
        a biasing member biasing the shading member drive lever such that the shading member recedes from the opening;
    wherein:
    the trailing blade drive lever and the connection member are brought to a connected state of being connected to each other, in a in where the trailing blade closes the opening and the shading member recedes from the opening;
    when the trailing blade drive lever moves such that the trailing blade recedes from the opening in the connected state, the shading member drive lever moves such that the shading member travels to the opening in response to the trailing blade drive lever with maintaining a closed state of the opening;
    the connected state is released while the trailing blade drive lever moves such that the trailing blade recedes from the opening, and the shading member drive lever is moved by a biasing force of the biasing member such that the shading member recedes from the opening; and
    the control portion reads out image data from the image pickup element in the closed state.

2. The image pickup device of claim 1,
    wherein:
    the trailing blade drive lever includes an engagement portion capable of engaging the connection member; and
    the connection member includes a support portion swingably connected to the shading member drive lever, and an engaged portion capable of engaging the engagement portion, and is a plate-shaped member extending from the support portion to the engaged portion.

3. The image pickup device of claim 2,
    wherein
    the focal plane shutter includes a connection biasing member,
    one end of the connection biasing member is secured to the shading member drive lever,
    another end of the connection biasing member is secured to the connection member, and
    the connection biasing member biases the connection member toward the trailing blade drive lever in the connected state.

4. The image pickup device of claim 1, wherein by swinging the trailing blade drive lever in one direction in the state where the connected state is released, the trailing blade drive lever is brought to the connected state of being connected with the connection member, and the connection member suppresses a bounce of the trailing blade drive lever in the opposite direction.

5. The image pickup device of claim 1,
    wherein:
    the focal plane shutter includes a roller rotatably supported by the board; and
    the roller guides the connection member so as to disengage the connection member from the trailing blade drive lever while the trailing blade drive lever moves such that the trailing blade recedes from the opening in the connected state.

6. The image pickup device of claim 3, wherein by replacing the roller with another roller different therefrom in diameter, a timing when the connection member is disengaged from the trailing blade drive lever is adjusted.

7. The image pickup device of claim 1, wherein the connection member is located between the opening and a phantom line connecting swinging centers of the trailing blade drive lever and the shading member drive lever.

8. A focal plane shutter comprising:
    a board including an opening;
    a mechanical trailing blade capable of opening and closing the opening;
    a trailing blade drive lever driving the trailing blade;
    an actuator actuating the trailing blade drive lever;
    a shading member capable of opening and closing at least a part of the opening;
    a shading member drive lever driving the shading member drive lever; and
    a biasing member biasing the shading member drive lever such that the shading member recedes from the opening;
    wherein;
    the trailing blade drive lever and the connection member are brought to a connected state of being connected to each other, in a state where the trailing blade closes the opening and the shading member recedes from the opening;
    when the trailing blade drive lever moves such that the trailing blade recedes from the opening in the connected state, the shading member travels to the opening in response to the training blade drive lever with maintaining a closed state of the opening; and
    the connected state is released while the trailing blade drive lever moves such that the trailing blade recedes from the opening, and the shading member drive lever is moved by a biasing force of the biasing member such that the shading member recedes from the opening.

* * * * *